United States Patent
Gilleran

(12) 
(10) Patent No.: US 6,395,984 B1
(45) Date of Patent: May 28, 2002

(54) SUB EXTERIOR WEATHER-PROOF FLASHING PANEL MOUNT FOR ELECTRICAL JUNCTION BOX

(76) Inventor: William J. Gilleran, 27881 Trocadero, Mission Viejo, CA (US) 92692

( * ) Notice: Subject to any disclaimer, the term of this patent is extended or adjusted under 35 U.S.C. 154(b) by 0 days.

(21) Appl. No.: 09/725,366

(22) Filed: Nov. 29, 2000

(51) Int. Cl.[7] ............................................. H01H 13/04
(52) U.S. Cl. ........................... 174/58; 174/50; 174/53; 220/3.2
(58) Field of Search ............................... 174/58, 50, 53, 174/54, 55, 56, 57, 61, 66, 67; 220/3.2, 3.3, 3.5, 3.6, 3.7, 3.8, 3.94, 241

(56) References Cited

U.S. PATENT DOCUMENTS

| | | | |
|---|---|---|---|
| 4,296,870 A | * 10/1981 | Balkwill et al. | 220/3.8 |
| 4,526,407 A | 7/1985 | Kifer | 285/42 |
| 4,673,097 A | * 6/1987 | Schuldt | 220/3.2 |
| 4,757,158 A | * 7/1988 | Lentz | 174/53 |
| 4,794,207 A | * 12/1988 | Norberg et al. | 174/48 |
| 4,903,997 A | 2/1990 | Kifer | 285/43 |
| 4,927,039 A | * 5/1990 | McNab | 174/57 |
| 4,952,754 A | * 8/1990 | Rye | 174/53 |
| 5,171,939 A | * 12/1992 | Shottey | 174/67 |
| 5,287,665 A | * 2/1994 | Rath, Jr. | 174/48 |
| 5,402,902 A | * 4/1995 | Bouley | 220/3.2 |
| 5,740,936 A | * 4/1998 | Nash | 220/3.3 |
| 6,239,365 B1 | * 5/2001 | McEvers | 174/50 |

* cited by examiner

Primary Examiner—Dean A. Reichard
Assistant Examiner—Angel R. Estrada
(74) Attorney, Agent, or Firm—Stetina Brunda Garred & Brucker

(57) ABSTRACT

A moisture-proof flashing panel mount for an electrical connector box to be disposed within a building structure wall when such a box has a shaped border defining an exteriorly accessible opening into which electrical wiring eventually is directed. The mount is a generally flat and generally rigid moisture-impermeable panel having therethrough an exteriorly projecting lipped opening defining a frame having an interior frame surface. This interior frame surface is complimentary in shape to the shaped border of the connector box and is sized to allow the shaped border to reside by friction fit within the frame. The remainder of the panel is disposed lateral to the frame and is effectively covered with wall finishing material such as lath paper and stucco which is applied to also surround the outer wall of the exteriorly projecting lip that forms the frame. As is apparent, the installation above-described completely prohibits any moisture entry around and into the building-structure wall within which the electrical connector box is situated, with such moisture entry prohibition continuing for the life of the building structure.

17 Claims, 3 Drawing Sheets

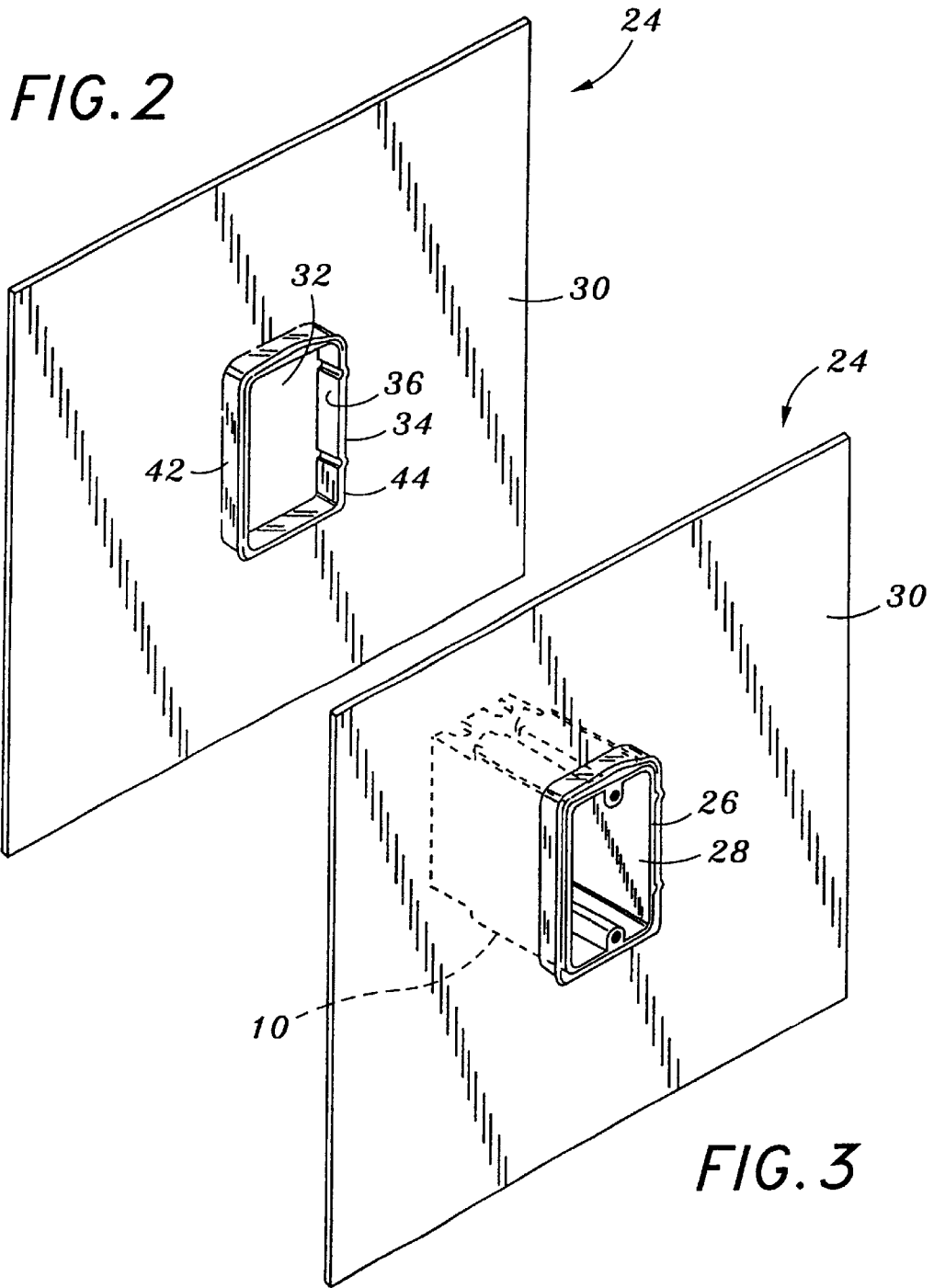

SUB EXTERIOR WEATHER-PROOF FLASHING PANEL MOUNT FOR ELECTRICAL JUNCTION BOX

CROSS-REFERENCE TO RELATED APPLICATIONS (Not Applicable).

STATEMENT RE: FEDERALLY SPONSORED RESEARCH/DEVELOPMENT (Not Applicable).

BACKGROUND OF THE INVENTION

The present invention relates in general to external mounting frames positioned around a generally vertically oriented electrical junction box, and in particular to a moisture-proof flashing panel mount comprising a generally flat, rigid, moisture-impermeable panel having a framed opening therethrough for frictionally accommodating a front portion of the junction box to prohibit passage of water around the box and into the wall of the building.

In view of potentially untoward consequences that can develop upon the entry of water into the interior of a building structure, it is extremely important that vulnerable areas such as those surrounding electrical junction boxes disposed within external building walls be weatherproofed to prohibit undesirable moisture entry into the building structure. As is recognized, such water entry, whether from rain, snow, mis-directed lawn sprinklers, or vandalism, can literally ruin floors, walls, ceilings, etc., within a building as the water travels within the hidden inner portions of the structure. Electrical junction box mounting particularly is in need of weatherproofing improvement since, typically, the junction box is nailed to the exterior of a building frame member such as a wood stud, lath paper is then applied in layers over the entire vertical surface. The lath paper is either cut out or torn out around the electrical box. Then stucco, wood, brick, etc., is used to finish the outside of the building structure. Caulking is then typically applied at interface sites of the box and lath paper in an effort to weather-proof the junction box.

If the installer of the lath paper does not properly carry through with the caulk application to form a weather-proof seal, the installation is immediately flawed and water entry can occur shortly after completion. Where the paper and caulk applications are acceptable, the treatment may be effective initially, but the passage of time and the accompanying environmental influences many times causes the caulk compound to crack and eventually break away. Thereafter, unfortunately, environmental moisture can easily enter the building from the areas around the junction box and eventually cause water damage as above described within the building structure.

In view of the costly damage that can occur because of water intrusion, it is apparent that a need is present for effective and long-lasting moisture protection that can be quickly and properly installed during the building process and remain viable for the life of the structure. Accordingly, a primary object of the present invention is to provide a moisture-proof flashing panel mount for an electrical junction box that can be readily installed without installation error and be fully integrateable with conventional exterior finish materials.

Another object of the present invention is to provide a flashing panel mount wherein an otherwise flat rigid water-proof panel has therethrough a lipped protruding flange or frame for housing the front-most portion of the junction box to thereby create an external moisture impervious parameter over which lath paper and an exterior finish material can be applied.

These and other objects of the present invention will become apparent throughout the description thereof which now follows.

BRIEF SUMMARY OF THE INVENTION

The present invention comprises a moisture-proof flashing panel mount for an electrical connector or junction box to be disposed within a building structure wall when such a box has a shaped border defining an exteriorly accessible opening into which electrical wiring eventually is directed. The mount preferably comprises a one-piece generally flat and generally rigid moisture-impermeable panel having an exteriorly projecting lipped opening defining a frame or flange having an interior frame surface. This interior frame surface is complimentary in shape to the shaped border of the junction box and is sized to allow the shaped border to reside by friction fit within the frame. The remainder of the panel is disposed lateral to the frame and is effectively covered with wall finishing material such as lath paper and stucco which is applied to also surround the outer wall of the exteriorly projecting lip that forms the frame. It is to be noted that building codes generally require that such wall finishing material, as well as perhaps any other structure which would include the present inventive frame-forming lip, cannot overlap the box opening border because of possible interference with utility placement. As is apparent, the installation above-described completely prohibits any moisture entry around and into the building-structure wall within which the electrical connector box is situated, with such moisture entry prohibition continuing for the life of the building structure.

BRIEF DESCRIPTION OF THE DRAWINGS

An illustrative and presently preferred embodiment of the invention is shown in the accompanying drawings in which:

FIG. 2 is a perspective view of a moisture-proof flashing panel mount for an electrical junction box;

FIG. 3 is a perspective view of the flashing panel mount of FIG. 2 additionally including the electrical junction box in place;

DETAILED DESCRIPTION OF THE PREFERRED EMBODIMENTS

Figure 1:
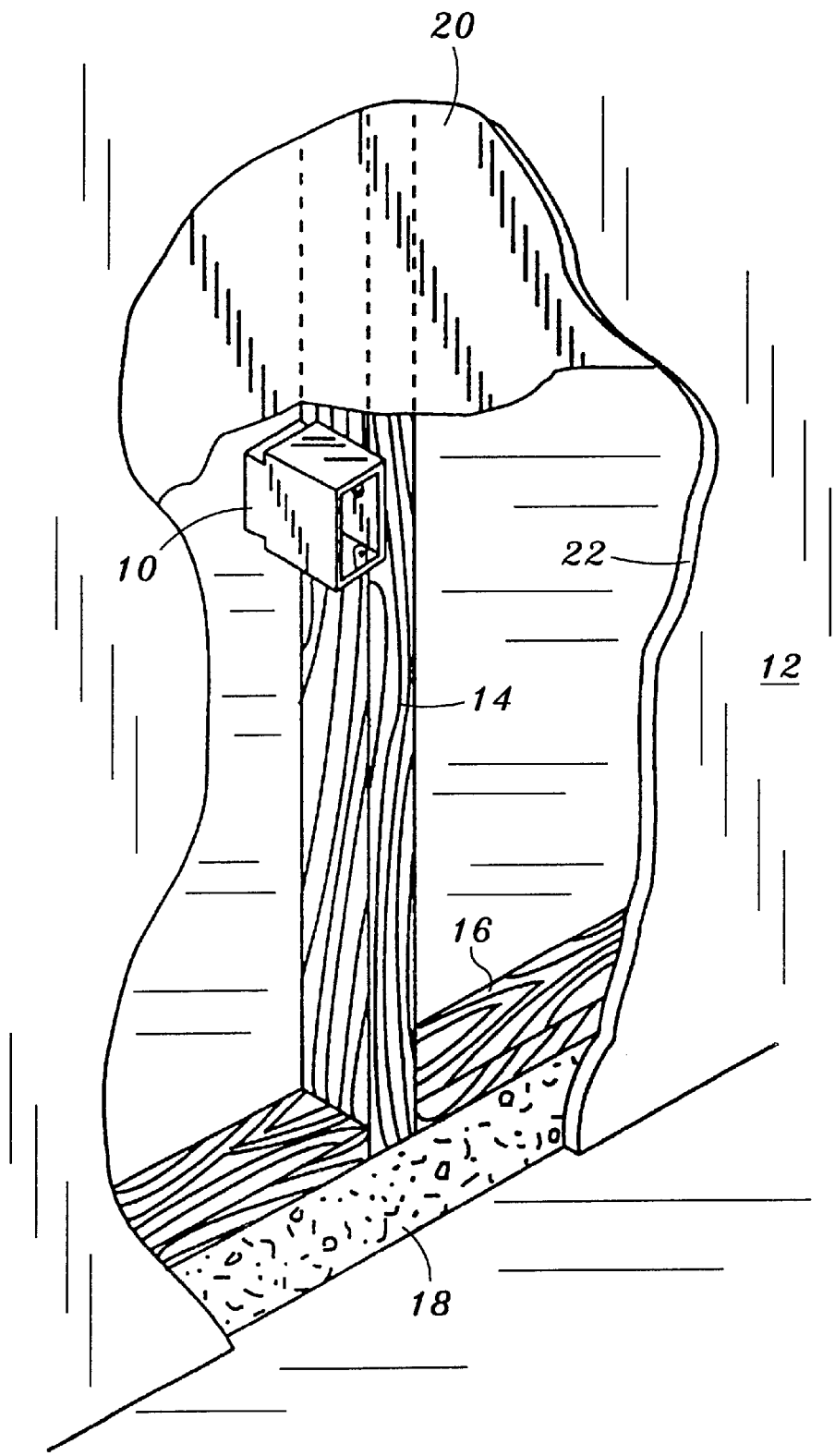
FIG. 1 is a perspective cut-away view of a prior art electrical junction box mounted within a wall structure.

Referring first to FIG. 1, a standard electrical junction box 10 is shown in a prior art conventional mount configuration within a wall 12 nailed to a standard two-by-four stud 14 extending upwardly from a base frame member 16 positioned on a concrete base 18. Conventional lath paper 20 and stucco 22 for finishing the wall 12 are shown. In a standard prior art installation, a plurality of layers of lath paper 20 typically would be brought to the borders of the connector box 10. Although not mandatory, typically caulking would be applied between the peripheral edges of the box and the lath paper. Thereafter the stucco 22 would be applied likewise to the borders of the connector box 10. A caulk bead (not shown) would then be applied along the borders of the connector box 10 at the intersection with the stucco 22.

Figure 4:
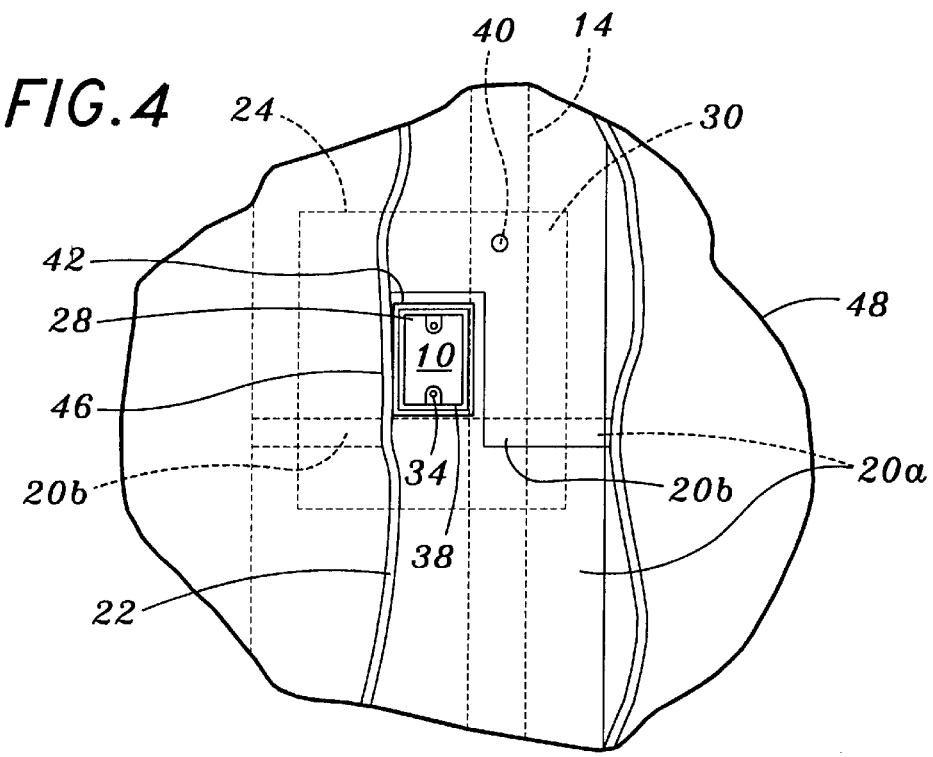
FIG. 4 is an elevation cut-away view of a wall portion illustrating the moisture-proof flashing panel mount in place in the wall.
Figure 5:
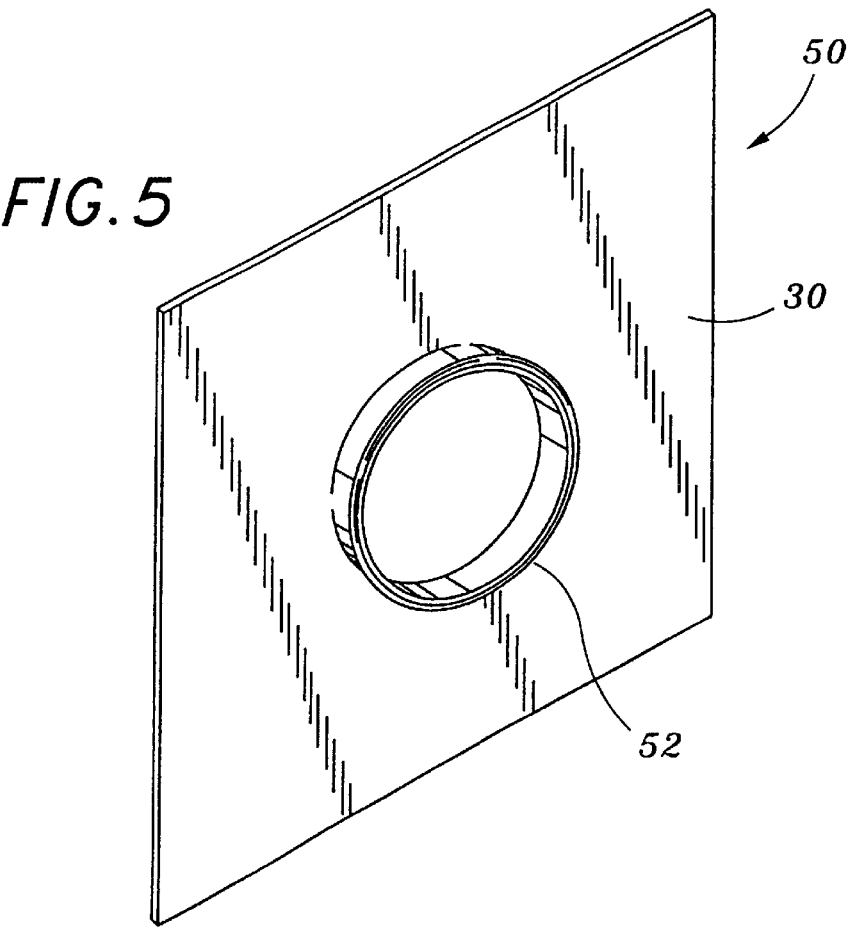
FIG. 5 is a perspective view of a second embodiment of a moisture-proof flashing panel mount for an electrical junction box.

FIGS. 2–4 illustrate the moisture-proof flashing panel mount 24 of the present invention for the electrical junction box 10 to be disposed within a building structure wall 48. As shown, the box 10 has a shaped border 26 defining an exteriorly accessible opening 28 for accommodating electrical wiring (not shown). The mount 24 preferably comprises a one-piece generally flat and generally rigid moisture-impermeable panel 30 having therethrough an exteriorly projecting lipped opening 32 defining a frame or flange 34 having an interior frame surface 36. The frame surface 36 is complimentary in shape to the four-sided shaped border 26 of the connector box 10, and is sized such that the border 26 can reside by friction fit within the frame 34. Should a junction box be circular in shape, a second embodiment of a moisture-proof flashing panel mount 50, as shown in FIG. 5, can be provided for like friction fit of the circular box within the frame 52 of the mount 50. Preferably, the mount 24, 50 is constructed of a plastic material via a stamp or mold procedure as commonly known in the art.

FIG. 4 shows the moisture-proof flashing panel mount 24 with box 10 in place and disposed within a structure wall 48. Specifically, the mount 24 is first positioned with the frame 34 thereof around and flush with the border 38 of the connector box 10. One nail 40 is driven through and near the top of the panel 30 into the stud 14 as shown. First lath paper 20a is then brought from below and positioned under the mount 24 as shown to extend vertically upward to approximately the bottom edge of the junction box. Subsequently a second lath paper 20b is brought from above the mount 24 to extend across the face of the mount 24 with a cut-out being formed for the opening 28 of the frame 34 and thus exposed opening 28 of the connector box 10. Thereafter, lath and stucco 22 is conventionally applied over the lath paper 20b, as the panel 30 provides backing for such stucco application, to terminate against the outside wall 42 of the frame 34 to be flush with the border 38 thereof. A bead 46 of caulk may be preferably applied along the intersection of the stucco 22 and connector box 10.

Upon completion of the installation and finishing of the wall, a weatherproof junction is made between the junction box 10 and the flashing panel mount 24. More specifically, upon the exterior of the wall confronting moisture such as rain or irrigation water, the water may travel downwardly on the exterior of the stucco wherein it confronts the upper lipped surface of the frame 34 of the panel mount 24. Due to the slight inclination, i.e., gabled configuration of the upper surface of the frame 34, water is channeled laterally outward and downwardly along the frame 34. The outer lip serves to prevent excess moisture from traveling over the lip and into the lip and into the electrical box. With the water being diverted laterally outward around the junction box, the water travels outwardly of the lath paper downwardly along the exterior of the wall and subsequently into the ground. As such, a weather resistant interface between the electrical box and the wall is formed which is not subject to failure due to installation error or reliance upon caulking.

Those skilled in the art will recognize that the water resistant/moisture-proofing flashing panel of the present invention may be formed having differing sizes and configurations for that associated with each of industry standard conventional electrical junction boxes. Further, although in the preferred embodiment the flashing panel is formed as a separate member for affixation to a conventional electrical junction box, those skilled in the art will recognize that the flashing panel can be formed as an integral portion of the junction box if desired.

While an illustrative and presently preferred embodiment of the invention has been described in detail herein, it is to be understood that the inventive concepts may be otherwise variously embodied and employed and that the appended claims are intended to be construed to include such variations except insofar as limited by the prior art.

What is claimed is:

1. A moisture-proof flashing panel mount for an electrical connector box mounted to an exterior of a walled structure, said box having a shaped border defining an exteriorly accessible opening thereto, the mount comprising a generally flat and generally rigid moisture-impermeable panel having therethrough an exteriorly projecting lipped opening defining a frame having an interior frame surface, said interior frame surface complimentary in shape to the shaped border of the connector box, whereby said shaped border can reside by friction fit within said frame.

2. A moisture-proof flashing panel mount as claimed in claim 1 wherein the interior frame surface is four-sided in shape.

3. A moisture-proof flashing panel mount as claimed in claim 1 wherein the interior frame surface is generally circular in shape.

4. A moisture-proof flashing panel mount as claimed in claim 1 wherein the mount is fabricated of a plastic material.

5. A wall mounting system for a utility connector box, the system comprising:

a) an electrical connector box mounted to an exterior of a walled structure, said connector box having an exteriorly accessible opening thereto through a shaped border defining said opening;

b) a moisture-proof flashing panel mount comprising a one-piece generally flat and generally rigid moisture-impermeable panel having therethrough an exteriorly projecting lipped opening defining a frame having an interior frame surface and an exterior frame surface, said interior frame surface complimentary in shape to the shaped border of the mounted connector box, with said shaped border residing by friction fit within said frame; and c) an exterior wall finish adjacent the lipped opening and covering the flat panel.

6. A wall mounting system for a utility connector box as claimed in claim 5 wherein the exterior wall finish comprises lath paper and stucco.

7. A wall mounting system for a utility connector box as claimed in claim 5 wherein the electrical connector box is four-sided.

8. A wall mounting system for a utility connector box as claimed in claim 5 wherein the electrical connector box is generally circular.

9. A wall mounting system for a utility connector box as claimed in claim 5 wherein the moisture-proof flashing panel mount is fabricated of a plastic material.

10. A moisture-proof flashing panel mount for an electrical connector box disposed about an exterior of an walled structure; the panel mount comprising:

a generally rigid panel sized and configured to be impermeable to water;

an exteriorly projecting lipped opening extended through the panel, the lipped opening defining a frame; and wherein the electrical connector box disposed about the exterior of the walled structure is mateable within the frame through the lipped opening.

11. The panel mount of claim 10 wherein the walled structure is a building.

12. The panel mount of claim 10 wherein the generally rigid panel has a generally flat configuration.

13. The panel mount of claim 10 wherein the frame has an interior frame surface and the electrical connector box has a shaped border, the interior frame surface being complimentary in shape to the shaped border of the electrical connector box.

14. The panel mount of claim 13 wherein the interior frame surface is four-sided in shape.

15. The panel mount of claim 13 wherein the interior frame surface is generally circular in shape.

16. The panel mount of claim 10 wherein the mount is fabricated of a plastic material.

17. The panel mount of claim 10 wherein the electrical connector box is mateable within the frame via a frictional fit.

* * * * *